US012689608B2

(12) United States Patent     (10) Patent No.:   US 12,689,608 B2

Gozlan et al.     (45) Date of Patent:     Jul. 21, 2026

(54) SIMILAR DOMAIN DETECTION USING SIMILARITY CHECK-BASED RANKING

(71) Applicant: Zscaler, Inc., San Jose, CA (US)

(72) Inventors: Roee Gozlan, Jerusalem (IL); Shoham Danino, Tel Aviv (IL)

(73) Assignee: Zscaler, Inc., San Jose, CA (US)

( * ) Notice: Subject to any disclaimer, the term of this patent is extended or adjusted under 35 U.S.C. 154(b) by 56 days.

(21) Appl. No.: 18/756,146

(22) Filed: Jun. 27, 2024

(65) Prior Publication Data

US 2026/0005998 A1     Jan. 1, 2026

(51) Int. Cl.
*H04L 61/4511*     (2022.01)
*H04L 61/59*     (2022.01)

(52) U.S. Cl.
CPC .......... *H04L 61/4511* (2022.05); *H04L 61/59* (2022.05)

(58) Field of Classification Search
CPC ............................. H04L 61/4511; H04L 61/59
See application file for complete search history.

(56) References Cited

U.S. PATENT DOCUMENTS

| | | | | |
|---|---|---|---|---|
| 7,761,583 B2 * | 7/2010 | Shull | ................... | H04L 63/1483 709/225 |
| 7,769,820 B1 * | 8/2010 | Spies | ...................... | H04L 63/08 709/219 |
| 8,286,239 B1 | 10/2012 | Sutton | | |
| 8,495,737 B2 | 7/2013 | Sinha et al. | | |
| 10,148,700 B2 * | 12/2018 | Cao | ........................ | H04L 63/101 |
| 10,419,477 B2 | 9/2019 | Desai et al. | | |
| 11,258,759 B2 * | 2/2022 | Goldstein | ............. | H04L 63/101 |
| 11,330,014 B2 * | 5/2022 | Schnieders | .......... | G06V 30/245 |
| 11,379,577 B2 * | 7/2022 | Patel | ..................... | G06F 21/566 |
| 11,799,823 B2 * | 10/2023 | Huffner | ............... | H04L 61/3025 |
| 11,799,876 B2 | 10/2023 | Desai et al. | | |
| 12,354,115 B2 * | 7/2025 | Wang | ................... | G06Q 30/018 |
| 12,513,185 B2 * | 12/2025 | Tymchenko | ........ | H04L 61/4511 |
| 2013/0007271 A1 * | 1/2013 | Stout | ................... | H04L 63/1441 709/224 |
| 2015/0039599 A1 * | 2/2015 | Carroll | .................. | G06F 16/955 707/723 |
| 2021/0248624 A1 * | 8/2021 | Keren | ................... | G06Q 50/184 |
| 2021/0336959 A1 * | 10/2021 | Shah | ................... | H04L 63/0281 |
| 2021/0377303 A1 | 12/2021 | Bui et al. | | |
| 2022/0067581 A1 | 3/2022 | Kumar et al. | | |
| 2023/0353587 A1 | 11/2023 | Bui et al. | | |
| 2024/0064171 A1 * | 2/2024 | Tyler | ..................... | G06F 16/907 |
| 2024/0250960 A1 | 7/2024 | Danino et al. | | |

* cited by examiner

*Primary Examiner* — Alex Tran

(74) *Attorney, Agent, or Firm* — Baratta Law PLLC; Lawrence A. Baratta, Jr.; Ryan Odessa

(57) ABSTRACT

Systems and methods for similar domain detection include receiving a base domain, the base domain being associated with an enterprise; receiving a domain list comprising a plurality of domains; performing a plurality of similarity checks between the base domain and each of the plurality of domains within the domain list; and generating a directory of domains comprising one or more domains determined to be associated with the enterprise based on the one or more similarity checks.

20 Claims, 6 Drawing Sheets

400

402   RECEIVING A BASE DOMAIN, THE BASE DOMAIN BEING ASSOCIATED WITH AN ENTERPRISE

404   RECEIVING A DOMAIN LIST COMPRISING A PLURALITY OF DOMAINS

406   PERFORMING A PLURALITY OF SIMILARITY CHECKS BETWEEN THE BASE DOMAIN AND EACH OF THE PLURALITY OF DOMAINS WITHIN THE DOMAIN LIST

408   GENERATING A DIRECTORY OF DOMAINS COMPRISING ONE OR MORE DOMAINS DETERMINED TO BE ASSOCIATED WITH THE ENTERPRISE BASED ON THE ONE OR MORE SIMILARITY CHECKS

400

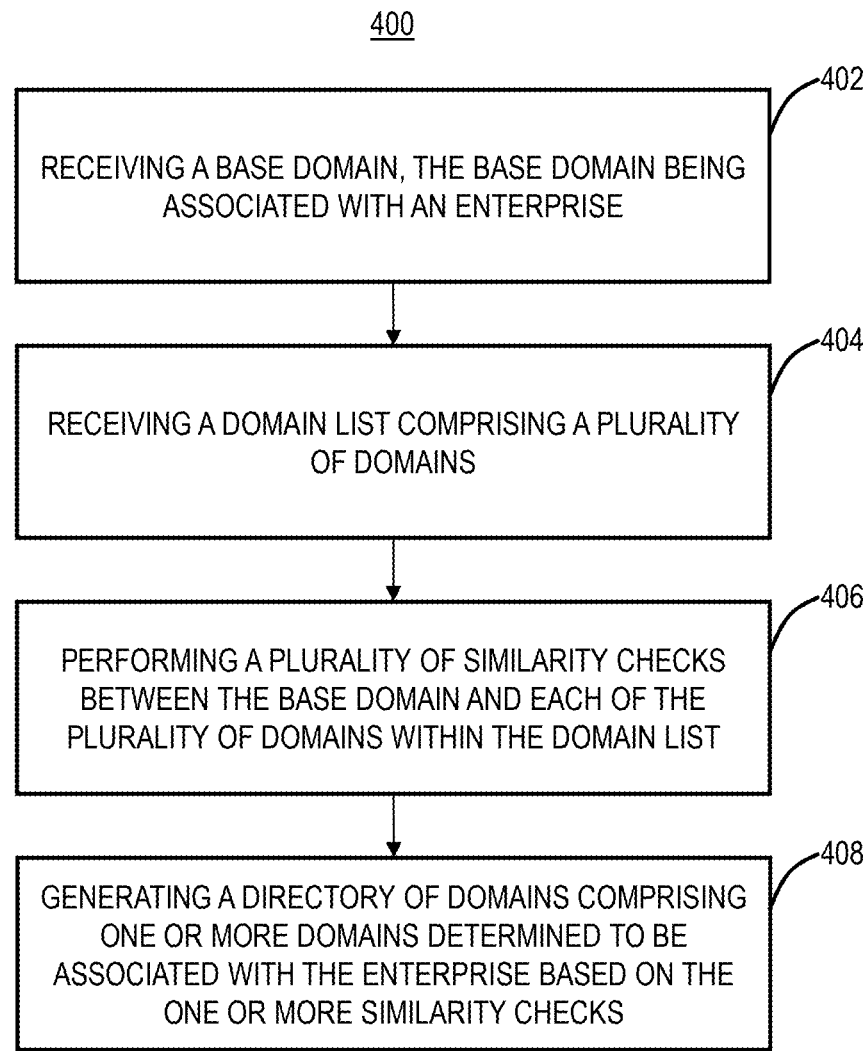

402

RECEIVING A BASE DOMAIN, THE BASE DOMAIN BEING ASSOCIATED WITH AN ENTERPRISE

404

RECEIVING A DOMAIN LIST COMPRISING A PLURALITY OF DOMAINS

406

PERFORMING A PLURALITY OF SIMILARITY CHECKS BETWEEN THE BASE DOMAIN AND EACH OF THE PLURALITY OF DOMAINS WITHIN THE DOMAIN LIST

408

GENERATING A DIRECTORY OF DOMAINS COMPRISING ONE OR MORE DOMAINS DETERMINED TO BE ASSOCIATED WITH THE ENTERPRISE BASED ON THE ONE OR MORE SIMILARITY CHECKS

FIG. 6

SIMILAR DOMAIN DETECTION USING SIMILARITY CHECK-BASED RANKING

FIELD OF THE DISCLOSURE

The present disclosure generally relates to network and cloud security. More particularly, the present disclosure relates to similar domain detection using similarity check-based ranking.

BACKGROUND OF THE DISCLOSURE

The detection of similar domains is a critical component in the field of domain management and cybersecurity. These systems are designed to identify domains that are related or similar in various ways, helping organizations to protect their digital assets, monitor brand reputation, and prevent cyber threats. Historically, one of the primary methods for detecting similar domains has been through the analysis of WHOIS databases. WHOIS is a protocol that provides information about the registered users of a domain name and their contact details. By querying WHOIS databases, systems can identify domains registered by the same entity, thus inferring potential relationships between them. This approach, however, faces significant challenges when domain owners use privacy services or proxy registrations to mask their identity, rendering WHOIS data less effective. The present disclosure provides advanced similar domain detection mechanisms to efficiently provide organizations with directories of similar domains for utilization thereof.

BRIEF SUMMARY OF THE DISCLOSURE

The present disclosure relates to similar domain detection using similarity check-based ranking. In various embodiments, the present disclosure includes a method having steps, a processing device configured to implement the steps, a cloud-based system configured to implement the steps, and as a non-transitory computer-readable medium storing instructions for programming one or more processors to execute the steps. The steps include receiving a base domain, the base domain being associated with an enterprise; receiving a domain list including a plurality of domains; performing a plurality of similarity checks between the base domain and each of the plurality of domains within the domain list; and generating a directory of domains including one or more domains determined to be associated with the enterprise based on the one or more similarity checks.

The steps can further include determining a proxy company used by the organization and extracting the domain list based thereon. The steps can further include assigning one or more of the domains of the plurality of domains a similarity rank based on the plurality of similarity checks. The plurality of similarity checks can include a content check, a simple similarity check, and an advanced similarity check. Each of the one or more domains can be assigned a similarity rank based on a similarity check of the plurality of similarity checks which is satisfied. Each of the one or more domains can be assigned a similarity rank based on (i) whether they share a generic or unique Top Level Domain (TLD) with the base domain, (ii) whether they contain the base domain, and (iii) whether they satisfy a simple similarity check or an advanced similarity check. A domain from the domain list with a same unique Top Level Domain (TLD) as the base domain can be assigned a higher rank than a domain with a same generic TLD as the base domain. Generating the directory of domains can be further based on a similarity rank of the one or more domains and a similarity rank threshold. The similarity rank threshold can be predefined by the enterprise. The steps can be performed on a per-tenant basis in a multi-tenant cloud.

BRIEF DESCRIPTION OF THE DRAWINGS

The present disclosure is illustrated and described herein with reference to the various drawings, in which like reference numbers are used to denote like system components/method steps, as appropriate, and in which:

FIG. 6 is a flowchart of a process for similar domain detection.

DETAILED DESCRIPTION OF THE DISCLOSURE

Again, the present disclosure relates to systems and methods for similar domain detection for organizations utilizing the various network configurations described herein. More particularly, the present systems and methods can be facilitated via a cloud-based system and its various cloud security services for detecting similar domains of its customers. In various embodiments, the present systems and methods are adapted to, based on a provided base domain, determine a group/directory of domains that are associated with an enterprise. This is facilitated via a plurality of similarity checks and a ranking process, wherein domains can be ranked by their similarity based on the various similarity checks and various characteristics of each of the domains.

§ 1.0 Cybersecurity Monitoring and Protection Examples

Figure 1A:
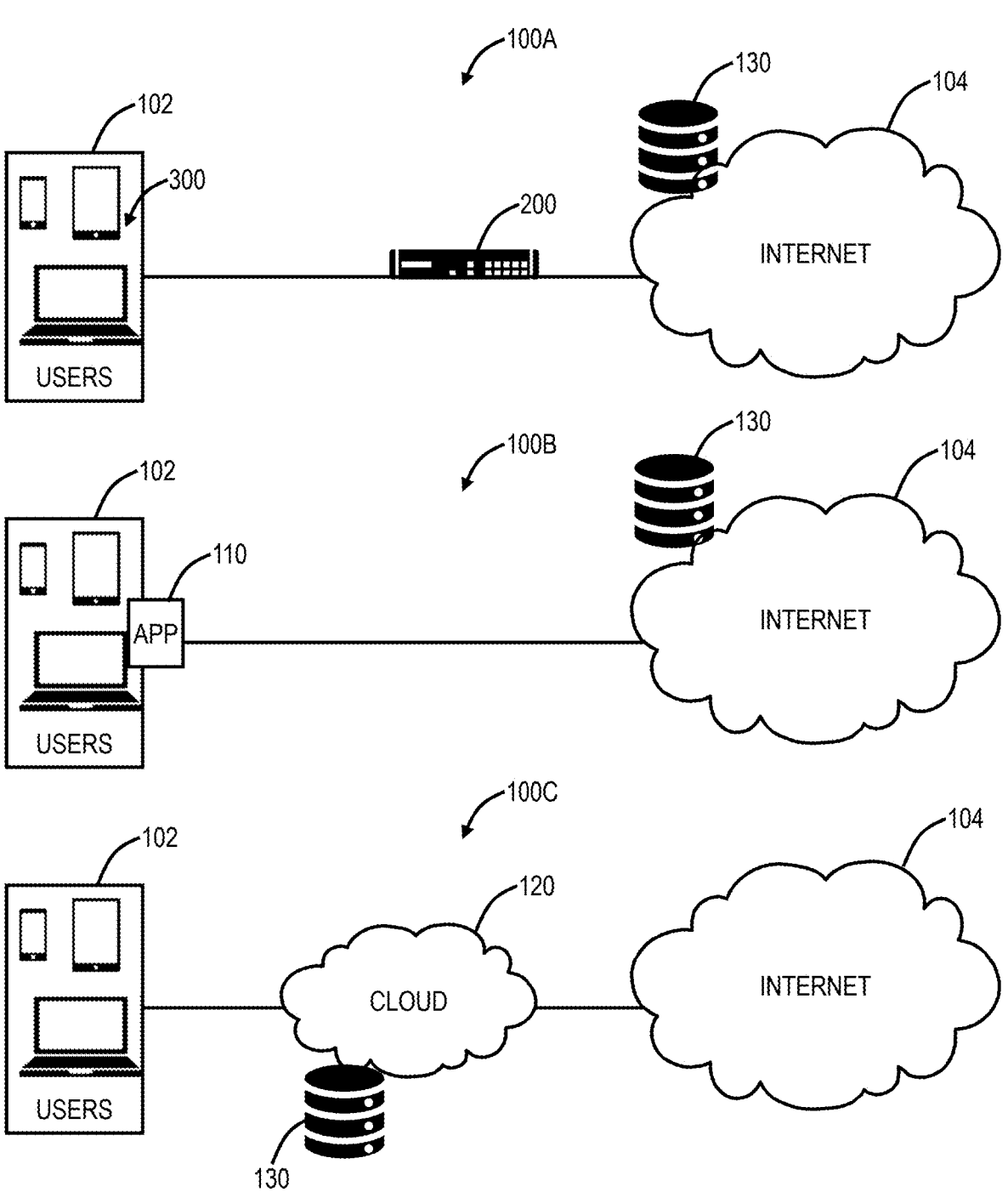
FIG. 1A is a network diagram of three example network configurations of cybersecurity monitoring and protection of a user.
Figure 2:
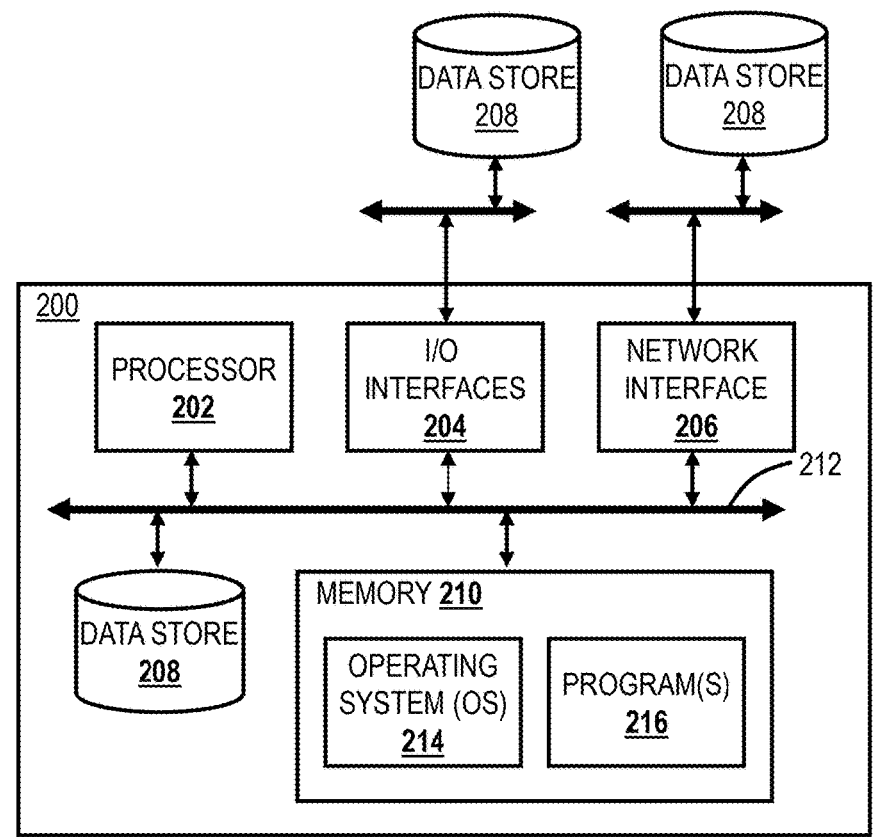
FIG. 2 is a block diagram of a server.

FIG. 1A is a network diagram of three example network configurations 100A, 100B, 100C of cybersecurity monitoring and protection of an endpoint 102. Those skilled in the art will recognize these are some examples for illustration purposes, there may be other approaches to cybersecurity monitoring (as well as providing generalized services), and these various approaches can be used in combination with one another as well as individually. Also, while shown for a single endpoint 102, practical embodiments will handle a large volume of endpoints 102, including multi-tenancy. In this example, the endpoint 102 communicates on the Internet 104, including accessing cloud services, Software-as-a-Service, etc. (each may be offered via computing resources, such as, e.g., using one or more servers 200 as illustrated in FIG. 2).

Note, the term endpoint 102 is used herein to refer to any computing device (see FIG. 3 for an example computing device 300) which can communicate on a network. The endpoint 102 can be associated with a user and include laptops, tablets, mobile phones, desktops, etc. Further, the endpoint can also mean machines, workloads, IoT devices, or simply anything associated with the company that connects to the Internet, a Local Area Network (LAN), etc.

As part of offering cybersecurity through these example network configurations 100A, 100B, 100C, there is a large amount of cybersecurity data obtained. Various embodiments of the present disclosure focus on using this cybersecurity data along with a customer's data to perform various security tasks including developing customer machine learning models and other security platforms of the like.

The network configuration 100A includes a server 200 located between the endpoint 102 and the Internet 104. For example, the server 200 can be a proxy, a gateway, a Secure Web Gateway (SWG), Secure Internet and Web Gateway, Secure Access Service Edge (SASE), Secure Service Edge (SSE), Cloud Application Security Broker (CASB), etc. The server 200 is illustrated located inline with the endpoint 102 and configured to monitor the endpoint 102. In other embodiments, the server 200 does not have to be inline. For example, the server 200 can monitor requests from the endpoint 102 and responses to the endpoint 102 for one or more security purposes, as well as allow, block, warn, and log such requests and responses. The server 200 can be on a local network associated with the endpoint 102 as well as external, such as on the Internet 104. Also, while described as a server 200, this can also be a router, switch, appliance, virtual machine, etc. The network configuration 100B includes an application 110 that is executed on the computing device 300. The application 110 can perform similar functionality as the server 200, as well as coordinated functionality with the server 200 (a combination of the network configurations 100A, 100B). Finally, the network configuration 100C includes a cloud service 120 configured to monitor the endpoint 102 and perform security-as-a-service. Of course, various embodiments are contemplated herein, including combinations of the network configurations 100A, 100B, 100C together.

The cybersecurity monitoring and protection can include firewall, intrusion detection and prevention, Uniform Resource Locator (URL) filtering, content filtering, bandwidth control, Domain Name System (DNS) filtering, protection against advanced threat (malware, spam, Cross-Site Scripting (XSS), phishing, etc.), data protection, sandboxing, antivirus, and any other security technique. Any of these functionalities can be implemented through any of the network configurations 100A, 100B, 100C. A firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The intrusion prevention and advanced threat protection can deliver full threat protection against malicious content such as browser exploits, scripts, identified botnets and malware callbacks, etc. The sandbox can block zero-day exploits (just identified) by analyzing unknown files for malicious behavior. The antivirus protection can include antivirus, antispyware, antimalware, etc. protection for the endpoints 102, using signatures sourced and constantly updated. The DNS security can identify and route commandand-control connections to threat detection engines for full content inspection. The DLP can use standard and/or custom dictionaries to continuously monitor the endpoints 102, including compressed and/or Transport Layer Security (TLS) or Secure Sockets Layer (SSL)-encrypted traffic.

In typical embodiments, the network configurations 100A, 100B, 100C can be multi-tenant and can service a large volume of the endpoints 102. Newly discovered threats can be promulgated for all tenants practically instantaneously. The endpoints 102 can be associated with a tenant, which may include an enterprise, a corporation, an organization, etc. That is, a tenant is a group of users who share a common grouping with specific privileges, i.e., a unified group under some IT management. The present disclosure can use the terms tenant, enterprise, organization, enterprise, corporation, company, etc. interchangeably and refer to some group of endpoints 102 under management by an IT group, department, administrator, etc., i.e., some group of endpoints 102 that are managed together. One advantage of multi-tenancy is the visibility of cybersecurity threats across a large number of endpoints 102, across many different organizations, across the globe, etc. This provides a large volume of data to analyze, use machine learning techniques on, develop comparisons, etc. The present disclosure can use the term "service provider" to denote an entity providing the cybersecurity monitoring and a "customer" as a company (or any other grouping of endpoints 102).

Of course, the cybersecurity techniques above are presented as examples. Those skilled in the art will recognize other techniques are also contemplated herewith. That is, any approach to cybersecurity that can be implemented via any of the network configurations 100A, 100B, 100C. Also, any of the network configurations 100A, 100B, 100C can be multi-tenant with each tenant having its own endpoints 102 and configuration, policy, rules, etc.

§ 1.1 Cloud Monitoring

The cloud 120 can scale cybersecurity monitoring and protection with near-zero latency on the endpoints 102. Also, the cloud 120 in the network configuration 100C can be used with or without the application 110 in the network configuration 100B and the server 200 in the network configuration 100A. Logically, the cloud 120 can be viewed as an overlay network between endpoints 102 and the Internet 104 (and cloud services, SaaS, etc.). Previously, the IT deployment model included enterprise resources and applications stored within a data center (i.e., physical devices) behind a firewall (perimeter), accessible by employees, partners, contractors, etc. on-site or remote via Virtual Private Networks (VPNs), etc. The cloud 120 replaces the conventional deployment model. The cloud 120 can be used to implement these services in the cloud without requiring the physical appliances and management thereof by enterprise IT administrators. As an ever-present overlay network, the cloud 120 can provide the same functions as the physical devices and/or appliances regardless of geography or location of the endpoints 102, as well as independent of platform, operating system, network access technique, network access provider, etc.

There are various techniques to forward traffic between the endpoints 102 and the cloud 120. A key aspect of the cloud 120 (as well as the other network configurations 100A, 100B) is that all traffic between the endpoints 102 and the Internet 104 is monitored. All of the various monitoring approaches can include log data 130 accessible by a management system, management service, analytics platform, and the like. For illustration purposes, the log data 130 is shown as a data storage element and those skilled in the art will recognize the various compute platforms described herein can have access to the log data 130 for implementing any of the techniques described herein for risk quantification. In an embodiment, the cloud 120 can be used with the log data 130 from any of the network configurations 100A, 100B, 100C, as well as other data from external sources.

The cloud 120 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Central-ization gives cloud service providers complete control over the versions of the browser-based and other applications provided to clients, which removes the need for version upgrades or license management on individual client com-puting devices. The phrase "Software-as-a-Service" (SaaS) is sometimes used to describe application programs offered through cloud computing. A common shorthand for a pro-vided cloud computing service (or even an aggregation of all existing cloud services) is "the cloud." The cloud 120 contemplates implementation via any approach known in the art.

The cloud 120 can be utilized to provide example cloud services, including Zscaler Internet Access (ZIA), Zscaler Private Access (ZPA), Zscaler Workload Segmentation (ZWS), and/or Zscaler Digital Experience (ZDX), all from Zscaler, Inc. (the assignee and applicant of the present application). Also, there can be multiple different clouds 120, including ones with different architectures and multiple cloud services. The ZIA service can provide the access control, threat prevention, and data protection. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services are also contemplated.

§ 1.2 Zero Trust

Figure 1B:
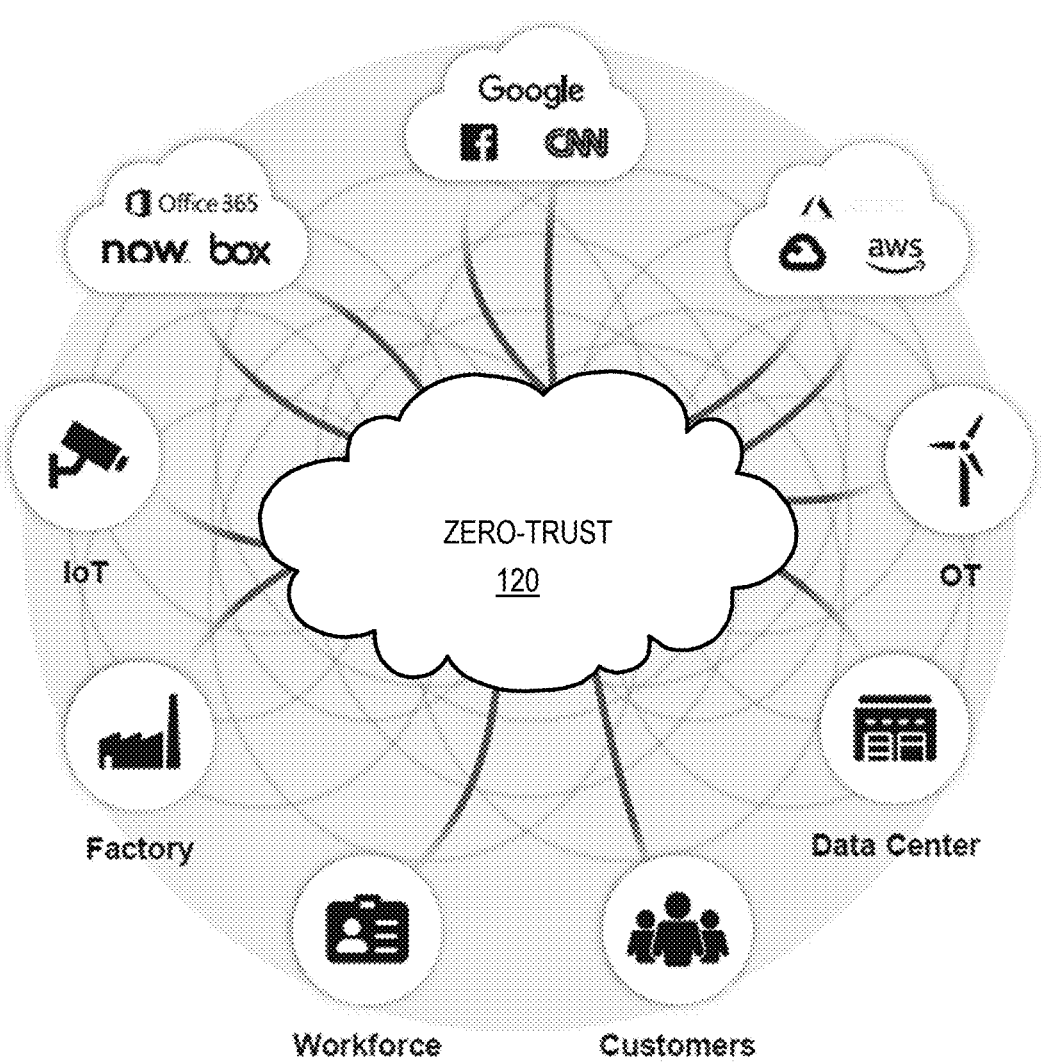
FIG. 1B is a logical diagram of the cloud operating as a zero-trust platform.

FIG. 1B is a logical diagram of the cloud 120 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud 120. Zero trust is a cybersecurity strategy where security policy is applied based on context established through least-privileged access controls and strict user authentication—not assumed trust. A well-tuned zero trust architecture leads to simpler network infrastruc-ture, a better user experience, and improved cyberthreat defense.

Establishing a zero-trust architecture requires visibility and control over the environment's users and traffic, includ-ing that which is encrypted; monitoring and verification of traffic between parts of the environment; and strong multi-factor authentication (MFA) approaches beyond passwords, such as biometrics or one-time codes. This is performed via the cloud 120. Critically, in a zero-trust architecture, a resource's network location is not the biggest factor in its security posture anymore. Instead of rigid network segmen-tation, your data, workflows, services, and such are pro-tected by software-defined micro segmentation, enabling you to keep them secure anywhere, whether in your data center or in distributed hybrid and multi-cloud environ-ments.

The core concept of zero trust is simple: assume every-thing is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero-trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network archi-tecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its Core are Three Tenets:

Terminate every connection: Technologies like firewalls use a "passthrough" approach, inspecting files as they are delivered. If a malicious file is detected, alerts are often too late. An effective zero trust solution terminates every con-nection to allow an inline proxy architecture to inspect all traffic, including encrypted traffic, in real time-before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero-trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

§ 1.3 Log Data

With the cloud 120 as well as any of the network configurations 100A, 100B, 100C, the log data 130 can include a rich set of statistics, logs, history, audit trails, and the like related to various endpoint 102 transactions. Generally, this rich set of data can represent activity by an endpoint 102. This information can be for multiple endpoints 102 of a company, organization, etc., and analyzing this data can provide a wealth of information as well as training data for machine learning models.

The log data 130 can include a large quantity of records used in a backend data store for queries. A record can be a collection of tens of thousands of counters. A counter can be a tuple of an identifier (ID) and value. As described herein, a counter represents some monitored data associated with cybersecurity monitoring. Of note, the log data can be referred to as sparsely populated, namely a large number of counters that are sparsely populated (e.g., tens of thousands of counters or more, and possible orders of magnitude or more of which are empty). For example, a record can be stored every time period (e.g., an hour or any other time interval). There can be millions of active endpoints 102 or more. Examples of the sparsely populated log data can be the Nanolog system from Zscaler, Inc., the applicant.

Also, such data is described in the following:

Commonly-assigned U.S. Pat. No. 8,429,111, issued Apr. 23, 2013, and entitled "Encoding and compression of statistical data," the contents of which are incorporated herein by reference, describes compression techniques for storing such logs, Commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage, and Commonly-assigned U.S. patent application Ser. No. 16/851,161, filed Apr. 17, 2020, and entitled "Systems and methods for efficiently maintaining records in a cloud-based system," the contents of which are incorporated herein by reference, describes compression of sparsely populated log data.

A key aspect here is that the cybersecurity monitoring is rich and provides a wealth of information to determine various assessments of cybersecurity. In some embodiments, the log data 130 can be referred to as weblogs or the like. Of note, with various cybersecurity monitoring techniques via the network configurations 100A, 100B, 100C, as well as with other network configurations, the log data 130 is a rich repository of endpoint 102 activity. Unlike websites, specific cloud services, application providers, etc., cybersecurity monitoring can log almost all of a user's 102 activity. That is, the log data 130 is not merely confined to specific activity (e.g., a user's 102 social networking activity on a specific site, a user's 102 search requests on a specific search engine, etc.).

§ 2.0 Example Server Architecture

FIG. 2 is a block diagram of a server 200, which may be used as a destination on the Internet, for the network configuration 100A, etc. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. Those skilled in the art will recognize that the cloud 120 ultimately runs on one or more physical servers 200, virtual machines, etc.

§ 3.0 Example Computing Device Architecture

Figure 3:
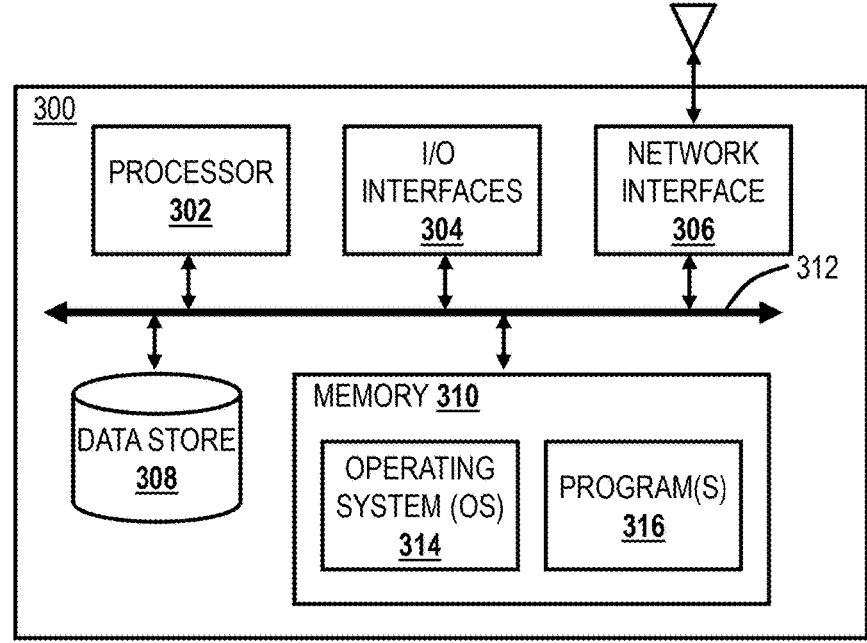
FIG. 3 is a block diagram of a computing device.

FIG. 3 is a block diagram of a computing device 300, which may be realize an endpoint 102. Specifically, the computing device 300 can form a device used by one of the endpoints 102, and this may include common devices such as laptops, smartphones, tablets, netbooks, personal digital assistants, cell phones, e-book readers, Internet-of-Things (IoT) devices, servers, desktops, printers, televisions, streaming media devices, storage devices, and the like, i.e., anything that can communicate on a network. The computing device 300 can be a digital device that, in terms of hardware architecture, generally includes a processor 302, I/O interfaces 304, a network interface 306, a data store 308, and memory 310. It should be appreciated by those of ordinary skill in the art that FIG. 3 depicts the computing device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the computing device 300, a semiconductor-based microprocessor (in the form of a microchip or chipset), or generally any device for executing software instructions. When the computing device 300 is in operation, the processor 302 is configured to execute software stored within the memory 310, to communicate data to and from the memory 310, and to generally control operations of the computing device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store

308 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the computing device 300. For example, example programs 316 may include, but not limited to, a web browser, social networking applications, streaming media applications, games, mapping and location applications, electronic mail applications, financial applications, and the like. The application 110 can be one of the example programs.

§ 4.0 Application for Traffic Forwarding and Monitoring

Again, the network configuration 100B includes an application 110 that is executed on the computing device 300. The application 110 can perform similar functionality as the server 200, as well as coordinated functionality with the server 200 (a combination of the network configurations 100A, 100B). Of course, various embodiments are contemplated herein, including combinations of the network configurations 100A, 100B, 100C together. For example, the application 110 can perform similar functionality as the cloud 120, as well as coordinated functionality with the cloud 120.

Figure 4:
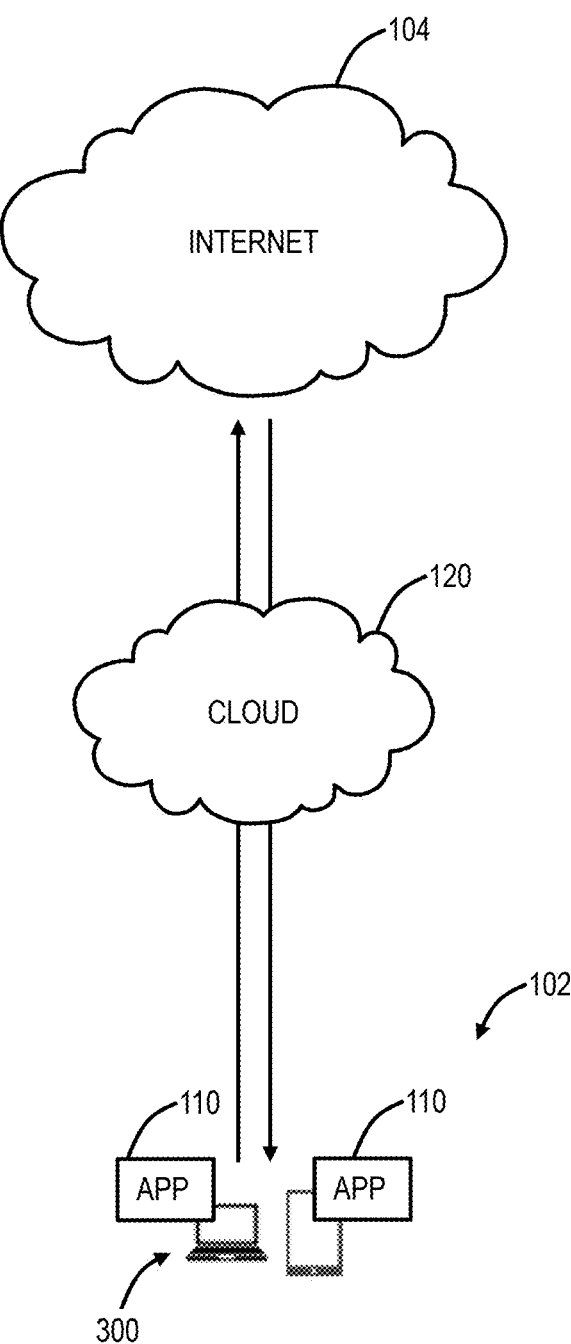
FIG. 4 is a diagram of an exemplary network configuration illustrating an application on computing devices configured to operate through the cloud.

FIG. 4 is a network diagram of an exemplary network configuration illustrating an application 110 on computing devices 300 configured to operate through the cloud 120. Different types of computing devices 300 are proliferating, including Bring Your Own Device (BYOD) as well as IT-managed devices. The conventional approach for a computing device 300 to operate with the cloud 120 as well as for accessing enterprise resources includes complex policies, VPNs, poor user experience, etc. The application 110 can automatically forward user traffic with the cloud 120 as well as ensuring that security and access policies are enforced, regardless of device, location, operating system, or application. The application 110 automatically determines if a user 102 is looking to access the open Internet 104, a SaaS app, or an internal app running in public, private, or the datacenter and routes mobile traffic through the cloud 120. The application 110 can support various cloud services, including ZIA, ZPA, ZDX, etc., allowing the best in class security with zero trust access to internal applications. As described herein, the application 110 can also be referred to as a connector application.

The application 110 is configured to auto-route traffic for seamless user experience. This can be protocol as well as application-specific, and the application 110 can route traffic with a nearest or best fit node of the cloud 120. Further, the application 110 can detect trusted networks, allowed applications, etc. and support secure network access. The application 110 can also support the enrollment of the computing device 300 prior to accessing applications, the internet, or any services provided by the cloud 120. The application 110 can uniquely detect the users 102 based on fingerprinting the user device 300, using criteria like device model, platform, operating system, device posture, etc. The application 110 can support Mobile Device Management (MDM) functions, allowing IT personnel to deploy and manage the computing devices 300 seamlessly. This can also include the automatic installation of client and SSL certificates during enrollment. Finally, the application 110 provides visibility into device and app usage of the user 102 of the computing device 300.

The application 110 supports a secure, lightweight tunnel between the computing device 300 and the cloud 120. For example, the lightweight tunnel can be HTTP-based. With the application 110, there is no requirement for PAC files, an IPSec VPN, authentication cookies, or user 102 setup.

§ 5.0 Similar Domain Detection

The present disclosure relates to systems and methods for similar domain detection for organizations utilizing the various network configurations 100A, 100B, and 100C described herein. More particularly, the present systems and methods can be facilitated via the cloud 120 and its various cloud security services for detecting similar domains of its customers.

This disclosure outlines a similar domain detection mechanism, a pivotal component of the Zscaler External Attack Surface Management (EASM) domain expansion mechanism designed to provide organizations with an extended roster of related domains. Unlike other steps in various mechanisms, such as leveraging business intelligence or the WHOIS database to identify company domains, the present approach focuses uniquely on string-based methods to detect domains that share similarities with a given domain, i.e., a domain of an organization which utilizes the cloud 120 described herein.

In various embodiments, the approach operates by taking a single domain as input and employing various techniques to uncover similar domains from a specified list. This approach is particularly valuable in scenarios where conventional methods fail to sufficiently expand the domain list. Moreover, it serves a crucial role in validating the domains identified through other mechanisms.

By prioritizing string-based similarity detection, the algorithm enhances the comprehensive nature of domain identification efforts within the Zscaler EASM framework. Its versatility lies in its ability to complement existing methods, ensuring a robust and reliable means of expanding and validating domain lists essential for effective cybersecurity and operational continuity.

The Zscaler EASM product offers a suite of advanced functionalities designed to empower customers with comprehensive visibility into their domains. Central to this capability is a feature that facilitates the creation of a detailed list of related domains sourced from diverse data repositories, i.e., a domain directory associated with an enterprise. Among these is a reverse WHOIS approach, which leverages the WHOIS domain data protocol to expand domain lists based on registrant information. This method is particularly effective in utilizing an organization's name to compile an exhaustive set of domains associated with its operations and digital footprint.

However, a significant challenge arises when domain owners opt to shield their identity by registering domains through proxy companies, thereby concealing their registrant details from public view. In such cases, relying solely on registrant information obtained through Reverse WHOIS may prove inadequate for generating a complete and accurate list of related domains.

To address this limitation and to enhance the capability of distinguishing related domains based on intrinsic characteristics, the present similar domain detection approach is introduced. In various embodiments, this approach is adapted to analyze a given list of domains alongside a specified base domain, identifying and ranking similar domains based solely on string similarities and structural patterns. By returning a curated list of similar domains (directory of domains) ranked by their degree of similarity, the approach significantly enhances the ability to pinpoint domains likely owned or managed by the same entity as the base domain. This functionality proves invaluable, particularly when the source list includes domains registered via the same proxy company, thereby suggesting a high probability of shared ownership or affiliation. In various embodiments, the domain list is determined based on the proxy company used by the organization. That is, the systems and methods can include steps of determining a proxy company used by an organization and extracting a domain list based thereon. For example, the domain list can be all domains managed by the proxy company, a subset of domains, etc. By extracting the domain list as described, the systems can obtain a list of extracted domains that have a high probability of including similar domains, i.e., domains that belong to the organization.

In various embodiments, the present similar domains detection approach described herein serves as a vital complement to reverse WHOIS by providing a robust mechanism for uncovering related domains even when registrant details are shielded. This ensures that customers can achieve unparalleled domain transparency and strengthen their cybersecurity posture, enabling them to proactively manage and protect their digital assets with confidence and precision.

As described, the present approach extracts similar domains from a given list based on a given base domain. Two main inputs ingested by the system include the base domain, which is a domain for which the similarity checks are conducted, and a domain list, which is a list of domains out of which the system extracts the similar domains. To effectively differentiate between varying degrees of similarity and provide flexible usability of the results, the system employs a similarity ranking principle. This method categorizes the outputs based on their level of similarity, ensuring that users can discern and utilize the data according to their specific needs and preferences. This is vital because in some embodiments, the output of the present approach is a list of domains that are assumed to be associated with the organization, thus, a tunable, rank-based output allows administrators of an organization to gage how strict or lenient the present output can be. For example, organizations can set the output to only include similar domains above a specific rank.

In various embodiments, based on the similarity checks, the system is adapted to output a dictionary containing all of the similar domains from the domain list. This dictionary of similar domains can be ranked from most similar domains to least similar domains, while allowing a flexible threshold.

A domain name is the part of a website address that users typically recognize and associate with a brand or organization. For example, in the domain "example.com," "example" is the domain name. The Top Level Domain (TLD) follows the final dot in a domain and serves as the highest-level identifier. TLDs come in several types, including generic TLDs (gTLDs) such as ".com," ".net," and ".org"; country-code TLDs (ccTLDs) such as ".uk" for the United Kingdom, ".au" for Australia, and ".jp" for Japan; and sponsored TLDs (sTLDs) that represent specific communities, such as ".gov" for the U.S. government. In "example.com," the TLD is ".com."

Between the domain name and the TLD, domains can have additional parts separated by dots, known as subdomains or Second Level Domains (SLDs). Subdomains indicate subsets of a larger domain, such as "shop.example.com," where "shop" is a subdomain of "example.com." SLDs add another layer of hierarchy, often used to show additional domain relationships. For instance, in "example.co.il," "co" serves as the SLD. Subdomains and SLDs can be further subdivided into third-level domains and beyond, providing a flexible structure for organizing web addresses.

Figure 5:
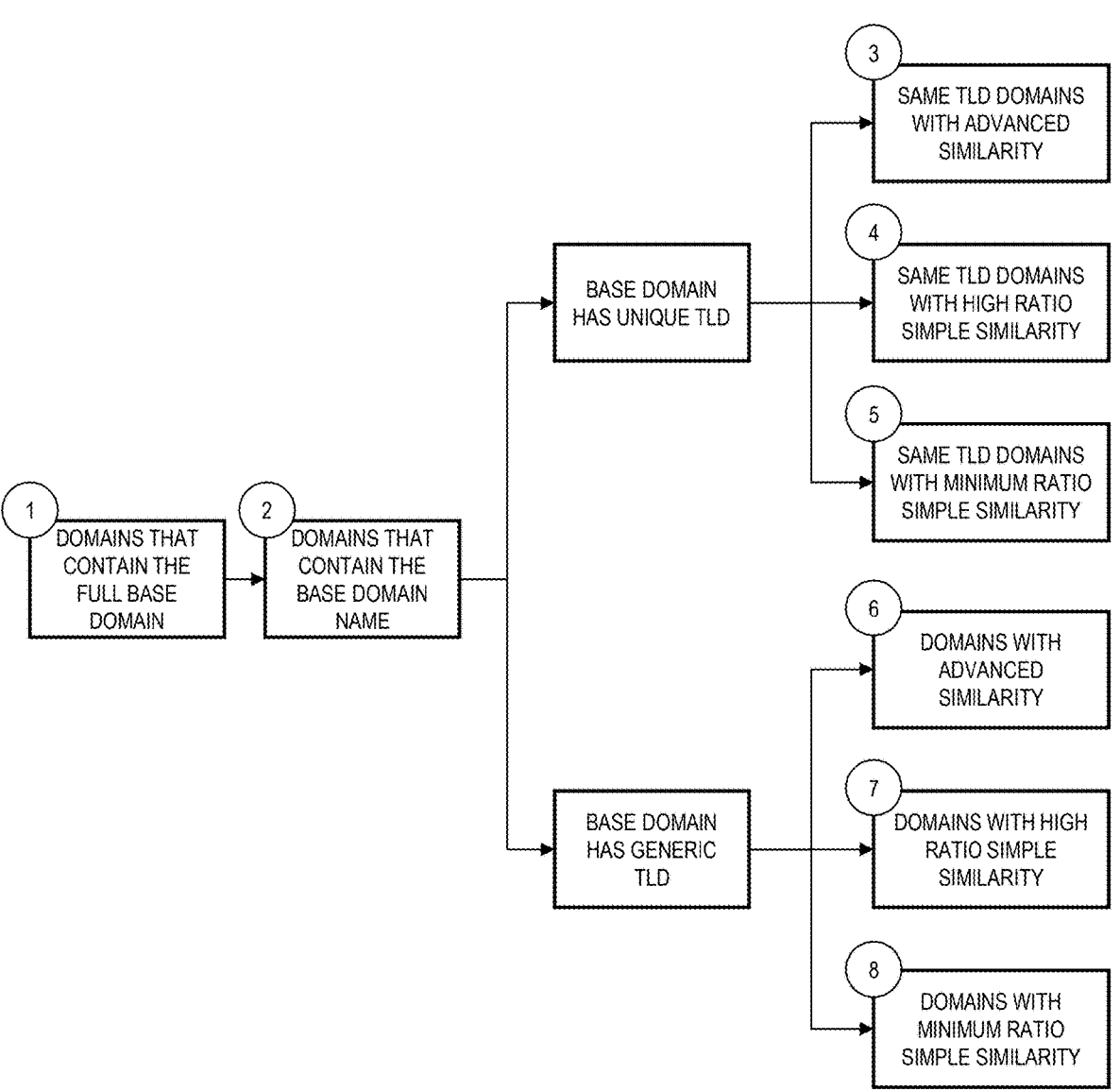
FIG. 5 is a flow diagram of various similarity checks performed by the present similar domain detection mechanism.

The present systems and methods extract similar domains by utilizing a plurality of checks. FIG. 5 is a flow diagram of various similarity checks performed by the present similar domain detection approach with associated similarity rankings. The similar domain detection approach can be provided via any of the cloud services described herein. That is, the present similar domain detection approach can be facilitated as part of the one or more cloud services to determine similar domains for customers of the cloud 120 and its services. In various embodiments, the present approach includes the utilization of various checks. These checks include a content check, a simple similarity check, an advanced similarity check, and checks for unique TLDs.

In an embodiment, the first check that is performed is the content check to detect a group of domains that contain the base domain. This includes determining domains that contain the full base domain with the TLD, i.e., detects completely related domains (e.g., subdomains of the base domain). For the base domain example.com, this check will return example.com.us, example.okta.com, etc. further, this check will return domains that contain the domain name without the TLD. For the base domain example.com this check will return example.org, example.met, etc.

In various embodiments, the second group of checks that the system conducts includes similarity checks. This can be performed using Python difflib module which provides functions that allow the comparison of two sequences. The approach uses the module's functions in order to compare strings, i.e., the base domain (with or without the TLD) to the other domains based on a minimum ratio of similarity. Again, the base domain is contemplated as the domain for which the similarity checks are conducted. The simple similarity check can use the difflib sequenceMatcher function for extracting all the similar domains to the base domain out of the list, based on a given ratio which determines the minimum level of similarity a domain needs to be considered similar and satisfying the check. The comparison uses the domain itself only, without the TLD. As part of the similarity ranking, this check is conducted twice, with varying rations, for example with a ratio of 0.6 and 0.7, but it can be modified easily for different needs. The advanced similarity check results are based on two methods. First, the system extracts the similar domains using difflib sequenceMatcher with a high ratio (which will not extract new domains, but rank them higher). Second, the system uses difflib get_matching_blocks in order to detect similar domains in which the matching part is long enough and located in the beginning of both strings. The principle behind this process is it is related to the pattern of domains and the similarity of domains owned by the same owner, while similarity in the beginning of the domains usually would be a strong indicate for correlation. For example, for the base domain example.com, examine.com would get a higher rank than staple.com.

More specifically, the algorithm conducts similarity checks between domains, using python difflib module which provides various functions allowing the comparison of two sequences. The output of this comparison is a similarity ratio, i.e., a measure of the sequences' similarity as a float variable in the range of $[0, 1]$. The ratio is determined by the number of matches within the two sequences compared to the total number of elements in both sequences. This ratio is compared to a minimum ratio (either the low or high ratio), determined within the algorithm as part of the algorithm flexibility approach. Each domain for which the sequence comparison returns a higher ratio than the minimum ratio determined, is considered similar and satisfying the specific check.

The advanced similarity check is a similarity check mechanism based on two methods of comparison. First, it extracts the similar domains using python difflib module with the same logic of the simple similarity checks, but with a higher ratio. Second, the algorithm uses difflib other function—get_matching_blocks—in order to detect similar sequences in which the matching part is long enough and located in the beginning of both sequences. The principle behind it is related to the pattern of domains and the similarity of domains owned by the same owner, while similarity at the beginning of the domains' strings would usually be a strong indicate for correlation. For example—for the base domain example.com, examine.com would get a higher rank than staple.com.

In various embodiments, in cases where the base domain's TLD is not a generic TLD (.com, .us, .net, etc.), another check is conducted as part of the domain ranking. This includes conducting separate checks for domains that have the same TLD as the base domain. This is performed because domains of the same owner will most likely share a same TLD. For example, for the base domain example.fun, examine.fun would get a higher rank than examine.com.

In various embodiments, the present ranking system is utilized for distinguishing similar domains based on their similarity level. For example, a similar domain with a rank of 1 will be more similar than a similar domain with a rank of 8. Further, in various embodiments, the rank assigned to a similar domain is based on the various similarity checks. That is, the present mechanism is adapted to perform the various similarity checks on strings of various domains and assign similarity rankings, for example, 1 (most similar) to 8 (least similar). This similarity ranking allows organizations to employ a flexible threshold, i.e., for filtering domains based on their score. For example, an organization may only want to receive a list of similar domains which are above a specific similarity ranking.

Referring back to FIG. 5, in various embodiments, the systems are adapted to perform three types of similarity checks. These checks include a content check, a simple similarity check, and an advanced similarity check. The content check includes determining all domains within the provided domain list that actually contain the base domain. This can include domains that include the full base domain, i.e., as a subdomain. Further checks include performing simple similarity checks and advanced similarity checks. In various embodiments, the difference between the simple similarity check and the advanced similarity check is that the advanced similarity check is more domain oriented. That is, the condition for a domain to be similar to the base domain is more domain oriented. Further, as shown, these similarity checks can be performed and associated with specific ranks based on the TLD of a domain in the list of domains. That is, the assigned rank can be based on whether the TLD is a generic TLD or a unique TLD. For example, and as shown in FIG. 5, a similar domain with a same unique TLD as the base domain will be assigned a higher rank than a domain with a same generic TLD as the base domain. Further, the rankings are based on the similarity check used to determine the similarity of the domain. For example, a domain that is found to be similar based on the advanced similarity check will receive a higher rank than a domain that was found to be similar based on the simple similarity check. Even further, a domain that was found to be similar based on the simple similarity check with a high ratio, i.e., high similarity, will be ranked higher than a domain found to be similar based on the simple similarity check with a low ratio. Again, these ratios can be preconfigured as described herein.

Below is a table having a plurality of similarity rankings and an explanation of how each rank is assigned to a similar domain based on the checks satisfied by the domain.

detected by the advanced similarity check. For example, the domain "examine.fun" would receive a rank of 3 if the base domain was "example.fun". A rank of 4 is assigned to a domain having the same TLD (unique TLD) detected by the simple similarity check with a high ratio. For example, the domain "sampleex.fun" would receive a rank of 4 if the base domain was "example.fun". A rank of 5 is assigned to a domain having the same TLD (unique TLD) detected by the simple similarity check with a minimum (low) ratio. For example, the domain "spalex.fun" would receive a rank of 5 if the base domain was "example.fun". Based on a domain having a same generic TLD as the base domain, a rank of 6-8 can be assigned. A rank of 6 is assigned to a domain having the same TLD (generic TLD) detected by the advanced similarity check. For example, the domain "examine.com" would receive a rank of 6 if the base domain was "example-.com". A rank of 7 is assigned to a domain having the same TLD (generic TLD) detected by the simple similarity check with a high ratio. For example, the domain "sampleex.com" would receive a rank of 7 if the base domain was "example-.com". A rank of 8 is assigned to a domain having the same TLD (generic TLD) detected by the simple similarity check with a minimum (low) ratio. For example, the domain "spalex.com" would receive a rank of 8 if the base domain was "example.com".

Based on these checks, a directory of similar domains can be generated and provided to the enterprise. The directory of domains can include each of the domain's rankings. Further, the system can be adapted to only include domains which

| Rank | Explanation | Example (for example.com) |
|---|---|---|
| 1 | domains containing the full base domain (from the domain name to the TLD) | example.com.us example.us.com |
| 2 | domains containing the base domain name | example.org |
| 3 | in case the base domain has a non-generic TLD - domains with the same TLD detected by advanced similarity check | for example.com - empty for example.fun - examine.fun |
| 4 | in case the base domain has a non-generic TLD - domains with the same TLD detected by simple similarity check - with a high ratio | for example.com - empty for example.fun - sampleex.fun |
| 5 | in case the base domain has a non-generic TLD - domains with the same TLD detected by simple similarity check - with the minimum ratio | for example.com - empty for example.fun - spalex.fun |
| 6 | domains detected by advanced similarity check | examine.com |
| 7 | domains detected by simple similarity check - with a high ratio | sampleex.com |
| 8 | domains detected by simple similarity check - with the minimum ratio | spalex.fun |

In the table above, each of the domain similarity rankings are explained and various examples are provided. Again, the similarity rank assigned to a domain is based on the similarity check which it satisfies. In an embodiment, for a rank of 1 (highest rank) the content check must be satisfied, where the domain being tested includes the full base domain, i.e., the domain to the TLD. In the example shown, the base domain is "example.com" thus, a similarity rank of 1 will be assigned to both of the domains "example.com.us" and "example.us.com". A rank of 2 is assigned to domains which contain the base domain name. For example, the domain "example.org" would satisfy the requirements for rank 2. Further, based on a domain having a same unique TLD as the base domain, a rank of 3-5 can be assigned. A rank of 3 is assigned to a domain having the same TLD (unique TLD)

have a similarity rank above a preconfigured threshold in the directory of domains. The directory of domains can be provided to users associated with the enterprise via associated computing devices 300.

It will be appreciated that the systems and methods described herein can be performed by components of the cloud 120 such as via one or more servers 200, Virtual Machines (VMs), nodes of the cloud 120, etc. as described herein. That is, the steps of the present processes can be performed on a per-customer basis for customers of the cloud 120. For example, a base domain can be received by the systems for a specific customer of the cloud 120. Based on the received base domain, the systems can retrieve a list of domains as described herein for performing the similar domain detection processes described herein for the specific customer.

§ 5.1 Process

FIG. 6 is a flowchart of a process 400 for similar domain detection. In various embodiments, the present disclosure includes a method having steps, a processing device configured to implement the steps, a cloud-based system configured to implement the steps, and as a non-transitory computer-readable medium storing instructions for programming one or more processors to execute the steps. The steps of process 400 include receiving a base domain, the base domain being associated with an enterprise (step 402); receiving a domain list including a plurality of domains (step 404); performing a plurality of similarity checks between the base domain and each of the plurality of domains within the domain list (step 406); and generating a directory of domains including one or more domains determined to be associated with the enterprise based on the one or more similarity checks (step 408).

The process 400 can further include determining a proxy company used by the organization and extracting the domain list based thereon. The steps can further include assigning one or more of the domains of the plurality of domains a similarity rank based on the plurality of similarity checks. The plurality of similarity checks can include a content check, a simple similarity check, and an advanced similarity check. Each of the one or more domains can be assigned a similarity rank based on a similarity check of the plurality of similarity checks which is satisfied. Each of the one or more domains can be assigned a similarity rank based on (i) whether they share a generic or unique Top Level Domain (TLD) with the base domain, (ii) whether they contain the base domain, and (iii) whether they satisfy a simple similarity check or an advanced similarity check. A domain from the domain list with a same unique Top Level Domain (TLD) as the base domain can be assigned a higher rank than a domain with a same generic TLD as the base domain. Generating the directory of domains can be further based on a similarity rank of the one or more domains and a similarity rank threshold. The similarity rank threshold can be predefined by the enterprise. The steps can be performed on a per-tenant basis in a multi-tenant cloud.

§ 6.0 Conclusion

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each potentially equipped with one or more processors. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. Additionally, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments.

What is claimed is:

1. A method for performing similar domain detection, the method comprising steps of:

receiving a base domain, the base domain being associated with an enterprise;

receiving a domain list comprising a plurality of domains;

performing a plurality of similarity checks between the base domain and each of the plurality of domains within the domain list, wherein performing the plurality of similarity checks comprises performing a content check that determines (i) domains that contain a full string of the base domain including a Top Level Domain (TLD) and (ii) domains that contain a domain-name portion of the base domain without the TLD, and performing one or more string-based similarity checks that compare a domain name portion of the base domain without the TLD to a domain-name portion of a respective domain without a TLD using a seq comparison that outputs a similarity ratio in a range of 0 to 1, and determining that the respective domain satisfies a corresponding similarity check when the similarity ratio exceeds a minimum ratio; and generating a directory of domains comprising one or more domains determined to be associated with the enterprise based on the one or more similarity checks and providing the directory of domains to a computing device associated with the enterprise.

2. The method of claim 1, wherein the steps further comprise:
   determining a proxy company used by the enterprise and extracting the domain list based thereon.

3. The method of claim 1, wherein the steps further comprise:
   assigning one or more of the domains of the plurality of domains a similarity rank based on the plurality of similarity checks by assigning a rank selected from a plurality of ranks that are ordered from most similar to least similar based on which of the plurality of similarity checks is satisfied by a domain and based further on whether a TLD of the domain matches a TLD of the base domain and whether the TLD is a generic TLD or a non-generic TLD.

4. The method of claim 3, wherein the plurality of similarity checks includes a content check, a simple similarity check, and an advanced similarity check, wherein the simple similarity check comprises using a sequenceMatcher function to compute the similarity ratio between the domain-name portion of the base domain without the TLD and the domain-name portion of the respective domain without the TLD, and wherein the advanced similarity check comprises (i) computing the similarity ratio using the sequenceMatcher function with a higher minimum ratio than the simple similarity check and (ii) using a get_matching_blocks function to detect a matching sequence that is at least a threshold length and located at a beginning of both compared domain-name portions.

5. The method of claim 3, wherein each of the one or more domains is assigned a similarity rank based on a similarity check of the plurality of similarity checks which is satisfied.

6. The method of claim 3, wherein each of the one or more domains is assigned a similarity rank based on (i) whether they share a generic or unique Top Level Domain (TLD) with the base domain, (ii) whether they contain the base domain, and (iii) whether they satisfy a simple similarity check or an advanced similarity check.

7. The method of claim 3, wherein a domain from the domain list with a same unique Top Level Domain (TLD) as the base domain is assigned a higher rank than a domain with a same generic TLD as the base domain.

8. The method of claim 1, wherein generating the directory of domains is further based on a similarity rank of the one or more domains and a similarity rank threshold.

9. The method of claim 8, wherein the similarity rank threshold is predefined by the enterprise.

10. The method of claim 1, wherein the steps are performed on a per-tenant basis in a multi-tenant cloud.

11. A non-transitory computer-readable medium comprising instructions that, when executed, cause one or more processors to perform steps of:
   receiving a base domain, the base domain being associated with an enterprise;
   receiving a domain list comprising a plurality of domains;
   performing a plurality of similarity checks between the base domain and each of the plurality of domains within the domain list, wherein performing the plurality of similarity checks comprises performing a content check that determines (i) domains that contain a full string of the base domain including a Top Level Domain (TLD) and (ii) domains that contain a domain-name portion of the base domain without the TLD, and performing one or more string-based similarity checks that compare a domain-name portion of the base domain without the TLD to a domain name portion of a respective domain without a TLD using a sequence comparison that outputs a similarity ratio in a range of 0 to 1, and determining that the respective domain satisfies a corresponding similarity check when the similarity ratio seeds a minimum ratio; and
   generating a directory of domains comprising one or more domains determined to be associated with the enterprise based on the one or more similarity checks and providing the directory of domains to a computing device associated with the enterprise.

12. The non-transitory computer-readable medium of claim 11, wherein the steps further comprise:
   determining a proxy company used by the enterprise and extracting the domain list based thereon.

13. The non-transitory computer-readable medium of claim 11, wherein the steps further comprise:
   assigning one or more of the domains of the plurality of domains a similarity rank based on the plurality of similarity checks by assigning a rank selected from a plurality of ranks that are ordered from most similar to least similar based on which of the plurality of similarity checks is satisfied by a domain and based further on whether a TLD of the domain matches a TLD of the base domain and whether the TLD is a generic TLD or a non-generic TLD.

14. The non-transitory computer-readable medium of claim 13, wherein the plurality of similarity checks includes a content check, a simple similarity check, and an advanced similarity check, wherein the simple similarity check comprises using a sequenceMatcher function to compute the similarity ratio between the domain-name portion of the base domain without the TLD and the domain-name portion of the respective domain without the TLD, and wherein the advanced similarity check comprises (i) computing the similarity ratio using the sequenceMatcher function with a higher minimum ratio than the simple similarity check and (ii) using a get_matching_blocks function to detect a matching sequence that is at least a threshold length and located at a beginning of both compared domain-name portions.

15. The non-transitory computer-readable medium of claim 13, wherein each of the one or more domains is assigned a similarity rank based on a similarity check of the plurality of similarity checks which is satisfied.

16. The non-transitory computer-readable medium of claim 13, wherein each of the one or more domains is assigned a similarity rank based on (i) whether they share a generic or unique Top Level Domain (TLD) with the base domain, (ii) whether they contain the base domain, and (iii) whether they satisfy a simple similarity check or an advanced similarity check.

17. The non-transitory computer-readable medium of claim 13, wherein a domain from the domain list with a same unique Top Level Domain (TLD) as the base domain is assigned a higher rank than a domain with a same generic TLD as the base domain.

18. The non-transitory computer-readable medium of claim 11, wherein generating the directory of domains is further based on a similarity rank of the one or more domains and a similarity rank threshold.

19. The non-transitory computer-readable medium of claim 18, wherein the similarity rank threshold is predefined by the enterprise.

20. The non-transitory computer-readable medium of claim 11, wherein the steps are performed on a per-tenant basis in a multi-tenant cloud.

* * * * *